(12) United States Patent
Wagenblast et al.

(10) Patent No.: US 12,097,561 B2
(45) Date of Patent: Sep. 24, 2024

(54) METHOD FOR OPERATING A MANUFACTURING DEVICE AND MANUFACTURING DEVICE FOR THE ADDITIVE MANUFACTURING OF A COMPONENT FROM A POWDER MATERIAL

(71) Applicant: TRUMPF Laser-und Systemtechnik GmbH, Ditzingen (DE)

(72) Inventors: Philipp Wagenblast, Leonberg (DE); Markus Pieger, Wendlingen am Neckar (DE); Frederik Schaal, Fellbach (DE); Matthias Allenberg-Rabe, Ludwigsburg (DE); Bjoern Ullmann, Boennigheim (DE); Valentin Blickle, Stuttgart (DE); Marc Gronle, Stuttgart (DE)

( * ) Notice: Subject to any disclaimer, the term of this patent is extended or adjusted under 35 U.S.C. 154(b) by 660 days.

(21) Appl. No.: 17/314,118

(22) Filed: May 7, 2021

(65) Prior Publication Data

US 2021/0260667 A1  Aug. 26, 2021

Related U.S. Application Data

(63) Continuation of application No. PCT/EP2019/080299, filed on Nov. 5, 2019.

(30) Foreign Application Priority Data

Nov. 7, 2018 (DE) ...................... 10 2018 218 991.9

(51) Int. Cl.
*B22F 12/90* (2021.01)
*B22F 10/28* (2021.01)
(Continued)

(52) U.S. Cl.
CPC .............. *B22F 12/90* (2021.01); *B22F 10/37* (2021.01); *B33Y 10/00* (2014.12); *B33Y 30/00* (2014.12);
(Continued)

(58) Field of Classification Search
CPC .......... B22F 12/90; B22F 10/37; B22F 10/28; B33Y 10/00; B33Y 30/00; B33Y 50/02;
(Continued)

(56) References Cited

U.S. PATENT DOCUMENTS

2015/0177158 A1* 6/2015 Cheverton ............ B29C 64/393
700/119
2018/0200957 A1 7/2018 Krüger et al.

FOREIGN PATENT DOCUMENTS

DE 102013214320 A1 1/2015
DE 102015212837 A1 1/2017
(Continued)

OTHER PUBLICATIONS

"Bin Zhang et. al., In Situ Surface Topography of Laser Powder Bed Fusion using Fringe Projection, 2016, Additive Manufacturing 12 2026, 100-107" (Year: 2016).*
(Continued)

*Primary Examiner* — Andrae S Allison
*Assistant Examiner* — Phuong Hau Cai
(74) *Attorney, Agent, or Firm* — LEYDIG, VOIT & MAYER, LTD.

(57) ABSTRACT

A method for operating a powder bed-based manufacturing device for additive manufacturing of a component from a powder material includes taking at least one optical recording of a working powder layer of the powder material on a construction location of the manufacturing device, locally evaluating the at least one optical recording, and examining
(Continued)

the working powder layer for local coating errors using the evaluation of the at least one optical recording.

8 Claims, 2 Drawing Sheets

(51) Int. Cl.
  *B22F 10/37* (2021.01)
  *B33Y 10/00* (2015.01)
  *B33Y 30/00* (2015.01)
  *B33Y 50/02* (2015.01)
  *G06T 7/00* (2017.01)

(52) U.S. Cl.
  CPC ............ *B33Y 50/02* (2014.12); *G06T 7/0008* (2013.01); *B22F 10/28* (2021.01); *G06T 2207/30136* (2013.01)

(58) Field of Classification Search
  CPC ......... G06T 7/0008; G06T 2207/30136; Y02P 10/25
  See application file for complete search history.

(56) References Cited

FOREIGN PATENT DOCUMENTS

DE    102016207059 A1    10/2017
WO    WO-2017085468 A1 *  5/2017    .............. B22F 10/00

OTHER PUBLICATIONS

Jorge Mireles et. al., Analysis and Correction of Defects within Parts Fabricated using Powder Bed Fusion Technology, 2015, Surf. Topogra.: Metrol. Prop 3 (Year: 2015).*
"Jamison L. Bartlett et. al., Revealing Mechanisms of Residual Stress Development in Additive Manufacturing via Digital Image Correlation, Apr. 2018, Additive Manufacturing 22 2018, 1-12" (Year: 2018).*
"Jeremy Adler et. al., Quantifying Colocalization by Correlation: The Pearson Correlation Coefficient is Superior to the Mander's Overlap Coefficient, Jul. 2010, Cytometry Part A vol. 77A, Issue 8 pp. 715-810" (Year: 2010).*
"Christian Gobert et. al., Application of supervised machine learning for defect detection during metallic powder bed fusion additive manufacturing using high resolution imaging, May 2018, Additive Manufacturing 21 208 517-528" (Year: 2018).*

* cited by examiner

METHOD FOR OPERATING A MANUFACTURING DEVICE AND MANUFACTURING DEVICE FOR THE ADDITIVE MANUFACTURING OF A COMPONENT FROM A POWDER MATERIAL

CROSS REFERENCE TO RELATED APPLICATIONS

This application is a continuation of International Application No. PCT/EP2019/080299 (WO 2020/094672 A1), filed on Nov. 5, 2019, and claims benefit to German Patent Application No. DE 10 2018 218 991.9, filed on Nov. 7, 2018. The aforementioned applications are hereby incorporated by reference herein.

FIELD

The present invention relates to a method for operating a powder bed-based manufacturing device for the additive manufacturing of a component from a powder material, as well as to a manufacturing device, which is configured to carry out such a method.

BACKGROUND

In a powder bed-based manufacturing device, powder material is taken from a feed container and supplied to a construction location, for example a construction platform, on which a component is manufactured additively from the powder material. In particular, a powder bed of the powder material is formed on the construction location. In this case, it is important for a working powder layer arranged on the construction location to be defect-free, in particular fully, and as homogeneous as possible. At the start of a manufacturing process, defects of a working powder layer, in particular of an initially applied working powder layer, on the construction location may result from an unsuitable topography of a top layer of the powder material in the feed container, for example because this top layer is not planar, but for example has the geometry of a loose material cone. During the manufacturing process, defects in the working powder layer may result in particular from insufficient powder metering, displacement of the working powder layer by parts of the resulting component, for example edges of fused metal and/or smoke particles, which protrude upward, from metal splashes or the fact that sintered material below the newly applied working powder layer has a higher density, that is to say in particular greater compaction, than the powder material so that in some regions powder sinks down in the direction of the underlying layer. In order to compensate for this, it is then necessary to apply extra powder material in the new working powder layer, in particular as much extra powder material as has been fused as a surface in an underlying layer. For the reasons mentioned, it is important to monitor the so-called powder bed, that is to say the working powder layer applied on the construction location, as accurately as possible.

WO 2017/085468 A1 discloses a method for the optical monitoring of a working powder layer, wherein in this case differences between recorded images of successive powder material layers are determined overall, or rows and/or columns of the images are observed, the latter being carried out for the purpose of establishing errors in a delivery mechanism for delivering the powder material from the feed container to the construction location, in particular defects of a powder slider. Local assessment of the working powder layer is not possible in this way. Furthermore, the method is very complicated and expensive in terms of calculation.

SUMMARY

In an embodiment, the present disclosure provides a method that operates a powder bed-based manufacturing device for additive manufacturing of a component from a powder material. The method includes: taking at least one optical recording of a working powder layer of the powder material on a construction location of the manufacturing device; locally evaluating the at least one optical recording; and examining the working powder layer for local coating errors using the evaluation of the at least one optical recording.

BRIEF DESCRIPTION OF THE DRAWINGS

Subject matter of the present disclosure will be described in even greater detail below based on the exemplary figures. The invention defined by the following claims is not limited to the exemplary embodiments. All features described and/or illustrated herein can be used alone or combined in different combinations. The features and advantages of various embodiments will become apparent by reading the following detailed description with reference to the attached drawings, which illustrate the following:

DETAILED DESCRIPTION

Figure 1A:
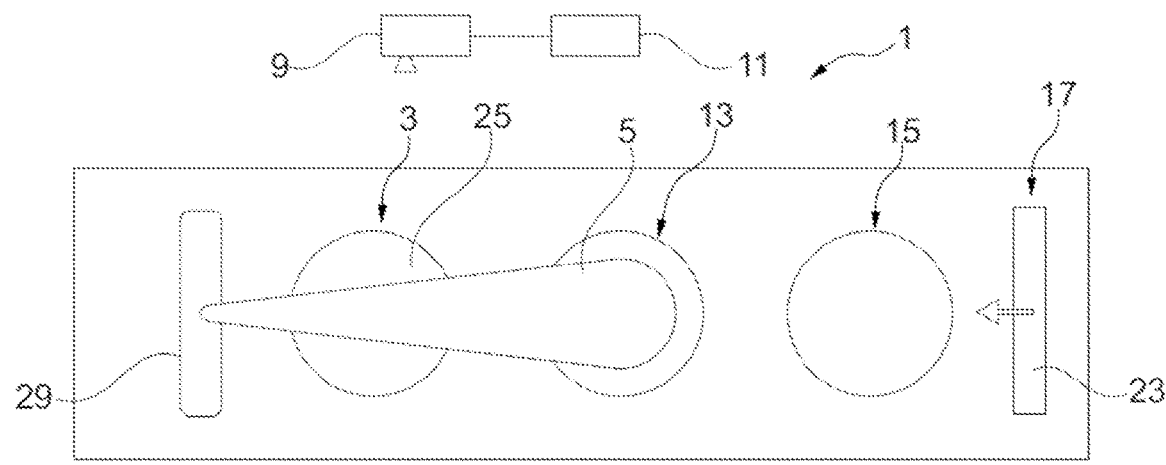
FIGS. 1a and 1b show a schematic representation of an exemplary embodiment of a manufacturing device.

Embodiments of the invention provide a method for operating a powder bed-based manufacturing device and a manufacturing device for the additive manufacturing of a component from a powder material, without the aforementioned disadvantages occurring.

For example, an embodiment of the present invention provides a method for operating a powder bed-based manufacturing device for the additive manufacturing of a component from a powder material, wherein at least one optical recording, that is to say in particular an image, of a working powder layer of a powder material on a construction location of the manufacturing device is taken. The at least one optical recording is locally evaluated, the working powder layer being examined for local coating errors with the aid of the evaluation of the optical recording. This procedure allows local evaluation of the working powder layer and assessment thereof in respect of possible defects. Furthermore—as will be explained below—the method can be carried out relatively simply and economically in terms of calculation.

Additive manufacturing is intended, in particular, to mean generative manufacturing of a component. In particular, this means layered construction of a component from powder material, in particular a manufacturing method which is selected from a group consisting of selective laser sintering, laser metal fusion (LMF), selective plasma sintering, electron beam melting (EBM), direct metal laser melting (DMLM), 3D printing, and electron beam sintering.

A working powder layer is intended, in particular, to mean a powder layer in which a new layer of the component to be produced is produced on the construction location. The working powder layer is also referred to as a powder bed.

A construction location is intended, in particular, to mean that location of the manufacturing device on which the resulting component is formed from the powder material. In this case, it may, in particular, be a construction platform of the manufacturing device.

That the at least one optical recording is locally evaluated preferably means that it is evaluated by pixel or by pixel group. A pixel group is in this case intended to mean a restricted region of the optical recording, which is restricted in the direction of both image coordinates of the two-dimensional recording. A local evaluation is thus, in particular, an evaluation in an image region that is restricted in both image coordinates. A local evaluation is therefore, in particular, not an evaluation that relates to an entire column or an entire row of the optical recording. Furthermore, a local evaluation is not an evaluation that globally takes the total recording into account. Preferably, the total optical recording is locally evaluated, this meaning that it is evaluated position by position, but not globally overall. A pixel group or a local evaluation region is preferably limited to an image region that in each image coordinate includes a single-figure number of pixels or at most a low two-figure number of pixels, in particular at least 5 pixels to at most 11 pixels or at least 9 pixels to at most 21 pixels, the number of pixels in each image coordinate preferably being odd. Larger pixel groups or local evaluation regions are also possible, the local resolution decreasing with the size of the pixel group or of the local evaluation region.

According to one refinement of the invention, a local coating error, for which the working powder layer is examined with the aid of the evaluation of the optical recording, is selected from a group consisting of a deficiently coated region, an irregularly coated region, an uncoated region, and a torn edge. A deficiently coated region is in this case a region in which—expressed in terms of a setpoint application quantity—too little powder material is applied. An irregularly coated region has—in comparison with a setpoint homogeneity of the working powder layer—an insufficiently uniform coating. An uncoated region is a region in which, erroneously, no powder material is applied. A torn edge is a region in which the coating with powder material erroneously ends. In general, a coating error is in particular a defect in the coating of the construction location with powder material.

A deficiently coated region may, for example, occur when newly applied powder material sinks into fused regions below the new working powder layer because the fused regions have a smaller volume than the unfused powder material. An uncoated region may in particular result from upwardly protruding parts of layers arranged below the working powder layer, for example edges of fused metal, smoke particles or metal splashes. An irregularly coated region may, for example, occur because of errors or defects in a delivery mechanism, which is configured to deliver powder material from the feed container to the construction location. A torn edge occurs, in particular, where a coated region and an uncoated region adjoin one another. The coating errors may also result from an inadequate topography of a top layer of the powder material in the feed container, in particular during an initial application of the working powder layer before the start of the actual component manufacturing. In this case, in particular when the top layer of the powder material follows a loose material cone, too little powder material may be delivered to the construction location by the delivery mechanism so that deficiently coated regions and/or uncoated regions occur.

According to one refinement of the invention, the at least one optical recording is made with a resolution which is selected, in relation to an average powder particle size of the powder material, in such a way that brightness variations in individual pixels of the optical recording due to a locally different arrangement of the powder particles can be established. The locally different arrangement of the powder particles is referred to as a powder microstructure; the brightness variations resulting therefrom in individual pixels of the optical recording are referred to as an image microstructure. The aforementioned selection of the resolution means, in particular, that the resolution is so high that the optical scatterings of individual particles are not averaged out over a pixel. In this way, the local image microstructure, that is to say the local imaging noise, that results from the powder microstructure can be advantageously evaluated, particularly in order to be able to distinguish newly coated regions from uncoated or deficiently coated regions by comparing optical recordings of successive working powder layers. Specifically, it has been found that the local image microstructure changes during new coating, that is to say new application of the working powder layer, because of the rearrangement of the individual powder particles, that is to say in particular a modified powder microstructure of the new working powder layer in comparison with the preceding working powder layer. On the other hand, the image microstructure remains constant or almost constant in regions that have not been coated or have been coated deficiently, because at least a relevant fraction of the powder particles preserve their orientation here. If the resolution is then selected in such a way that these effects are not averaged out over a pixel of the recording, analysis of the image microstructure, in particular by pixel or by pixel group, makes it possible to establish whether a region imaged in an individual pixel or a pixel group has been newly coated, or whether there is an uncoated region or a deficiently coated region here.

To be distinguished from the image microstructure and the imaging noise is a recording system-related image noise, for example sensor noise, readout noise or the like, which is not considered here.

Preferably, in the scope of the method, the information depth of the brightness, that is to say in particular a number of bits with which the brightness is quantified, is also selected in such a way that corresponding brightness variations can be established.

An average powder particle size of the powder material is intended here in particular to mean an average equivalent diameter of the powder material, various measurement methods being usable in principle to establish a particle size distribution in the powder material, and in particular the average equivalent diameter. This is ultimately not an essential point. What is important is that the resolution of the optical recording is selected in such a way that the brightness variations explained above are finally established, and the local image microstructure modified in the scope of new coating can, therefore, be evaluated. An average powder particle size of, for example, aluminum powder may, for example, be from 10 μm to 53 μm.

According to one refinement of the invention, a topography of a top layer of the powder material in the feed container is deduced with the aid of the coating errors established. By means of the monitoring of the working powder layer, conclusions may therefore be drawn relating to the topography of the top layer in the feed container. In particular, a particular topography of the top layer in the feed container, for example a hole or a loose material cone, may be deduced from incomplete powder coating on the construction location and/or from the nature of the incomplete powder coating. A direct measuring system that assesses the top layer in the feed container is not required in this case. Preferably, measures to make the topography of the top layer approximate a predetermined setpoint topography are then carried out on the basis of the coating errors established and/or the topography of the top layer deduced. The deduction of the topography of the top layer from coating errors established is preferably carried out before a start of manufacturing of a component, in particular initially, in order to ensure that there is a suitable top layer topography in the feed container at the start of the actual manufacturing, and error-free configuration of the working powder layer is therefore possible. For example, the delivery mechanism may be driven in a controlled way in order to make the topography of the top layer in the feed container approximate the predetermined setpoint topography, in particular a planar topography.

According to one refinement of the invention, the working powder layer is examined for coating errors during ongoing operation of the manufacturing device for the layered construction of a component. Errors may therefore be avoided during the construction of the component. Particularly preferably, every new working powder layer is examined for coating errors. Preferably, measures are instigated to eliminate coating errors when a coating error has been detected. In this case, in particular, recoating of the working powder layer or new coating of the working powder layer may be carried out, in particular until the working powder layer no longer has any coating errors.

According to one refinement of the invention, a first optical recording of a first working powder layer is compared with a second optical recording of a preceding—in particular a directly preceding—second working powder layer, the first working powder layer being examined for local coating errors with the aid of the comparison of the first optical recording with the second optical recording. A comparison image is preferably obtained by the comparison, the comparison image preferably being examined locally for features of coating errors. In this way, it is possible to establish incrementally or differentially whether successive working powder layers have coating errors, and in particular it is possible to establish whether the local image microstructure has changed between the second optical recording recorded initially and the subsequently recorded first optical recording. As already mentioned above, full new coating changes the local image microstructure, deficiently coated or uncoated regions being identifiable in particular in that the local image microstructure has changed to a smaller extent or has not changed at all. The second working powder layer is preferably a working powder layer from a directly preceding construction step for manufacturing the component, an optical recording of each new working powder layer preferably being taken continuously in the scope of the method and compared with the directly preceding optical recording of the directly preceding working powder layer.

The first optical recording and the second optical recording are preferably correlated with one another. In particular, the first optical recording and the second optical recording are preferably locally, in particular pixel-by-pixel, multiplied with one another, divided by one another, subtracted from one another, and/or combined with one another according to a more complex function.

According to one refinement of the invention, a coating error is locally detected where a difference between the first optical recording and the second optical recording is less than a predetermined limit difference or where such a difference does not exist. As already explained, successful new coating or new application of the working powder layer leads to local differences between the optical recordings of the preceding working powder layer and the new working powder layer, particularly in the local image microstructure, and a local coating defect may be deduced where a corresponding difference is small or does not exist.

According to one refinement of the invention, the first optical recording is correlated—in particular locally—with the second optical recording, a correlation image being produced, the correlation image being examined for local coating errors. In this way, a local correlation between the two optical recordings may be evaluated and examined in respect of coating errors. A low level of correlation in the correlation image in this case indicates error-free application of the new working powder layer, while a high level of correlation in the correlation image indicates a deficiently coated region or an uncoated region.

According to one refinement of the invention, the first optical recording is correlated—in particular locally—with the second optical recording by: a) multiplying the first optical recording and the second optical recording with one another pixel-by-pixel, a multiplication image being obtained therefrom, b) squaring the first optical recording pixel-by-pixel, from which a first exponential image is obtained, c) squaring the second optical recording pixel-by-pixel, from which a second exponential image is obtained, and d) respectively locally averaging the multiplication image, the first exponential image and the second exponential image—each independently—so that an averaged multiplication image, an averaged first exponential image and an averaged second exponential image are obtained. In this case, e) a correlation image is obtained by division of the averaged multiplication image by the square root of the product of the averaged first exponential image with the averaged second exponential image.

If the first optical recording is in this case denoted by A and the second optical recording is denoted by B, and the averaging is denoted by the bracket symbol < >, the correlation image C is given according to the following function:

$$C = \frac{\langle AB \rangle}{\sqrt{\langle A^2 \rangle \langle B^2 \rangle}}. \tag{1}$$

The individual calculation operations, that is to say in particular the multiplication/squaring of the optical recordings, the local averaging, and the division, forming the product and taking the square root in step e), are preferably carried out pixel-by-pixel.

The correlation function according to Equation (1) has the advantage that a merely global brightness difference between the optical recordings has no effect. If the first optical recording A differs from the second optical recording B only by a global brightness factor h, for example, so that B=h·A, bringing out the prefactor h gives:

$$C = \frac{h \langle AA \rangle}{h \sqrt{\langle A^2 \rangle \langle A^2 \rangle}} = 1. \tag{2}$$

The correlation image C thus behaves in this case as if the optical recordings A, B were the same.

On the other hand, local differences, in particular brightness variations, do have an effect in the correlation image, it following from the Cauchy-Schwarz inequality that the value of the correlation image C for pixels that are identical except for a global brightness difference is =1, the value being commensurately smaller when the pixels considered are correlated less with one another. With the aid of the correlation image C, it is therefore possible to identify regions in which error-free new coating of the construction location has not taken place, deficiently coated regions and uncoated regions being distinguished by values close to 1 in the correlation image while regions newly coated without errors have lower values.

The local averaging of the individual images is in particular carried out pixel-by-pixel for each pixel, the averaging preferably being carried out over a restricted pixel range in the environment of the pixel respectively considered. This pixel range is preferably the same for each pixel and for all images. In particular, the averaging may be carried out over a region which has an extent of a single-figure number of pixels or a low two-figure number of pixels in both image coordinates, in particular from at least five pixels to at most eleven pixels, preferably from at least seven pixels to at most twenty-one pixels, preferably nine pixels, the pixel range particularly preferably being selected to be square, in particular with an edge length of nine pixels. Particularly preferably, the pixel considered, over the environment of which the averaging is carried out, is in this case a central pixel of this pixel range. The pixel considered may, however, also be defined as an edge or corner pixel of the pixel range. Larger or smaller pixel ranges are also possible.

It is possible for different pixel ranges—although preferably with an identical number of pixels—to be selected for pixels at edges of the optical recordings, since edge pixels lack direct nearest neighbors on one side and corner pixels lack direct nearest neighbors on two sides.

In particular, a variation of the image microstructure between the first optical recording and the second optical recording may be evaluated with the method proposed here. In particular, with the aid of the method, a check is made in a local region around a pixel as to whether the optical recordings are similar to one another.

The method proposed here works with very good results even for very thin working powder layers having layer thicknesses of at most 100 µm, preferably with layer thicknesses of at most 60 µm, preferably with layer thicknesses of at most 40 µm, but also smaller layer thicknesses. With the aid of the method, deficiently coated or uncoated regions, in general defects or coating errors, which cannot be seen with the naked eye, may therefore in particular also be automatically detected in this case.

An embodiment of the present invention also provides a manufacturing device, in particular a powder bed-based manufacturing device, which is configured for the additive manufacturing of a component from a powder material. The manufacturing device includes a construction location, in particular a construction platform, configured for the additive, in particular layered, construction of a component from the powder material on the construction location, and an optical recording device, the optical recording device being configured to take optical recordings of the construction location, in particular of a working powder layer of the powder material on the construction location, the manufacturing device furthermore comprising a control device which is configured to locally evaluate at least one optical recording, taken by the optical recording device, of a working powder layer on the construction location and to examine the working powder layer for local coating errors with the aid of the local evaluation of the at least one optical recording. The powder material is present on the construction location particularly in the form of a powder bed. In particular, the advantages that have already been explained in connection with the method are achieved in connection with the manufacturing device.

The manufacturing device is, in particular, configured to carry out the method according to the invention or one of the above-described embodiments of the method.

The manufacturing device preferably comprises a locally orientable energy source, in particular radiation source, which is configured and arranged to connect, in particular to fuse, powder material locally on the construction location, in particular on the construction platform in order to produce a layer of the component to be formed. This may in particular be a laser beam device, an electron beam device, a plasma device or the like.

Figure 1B:
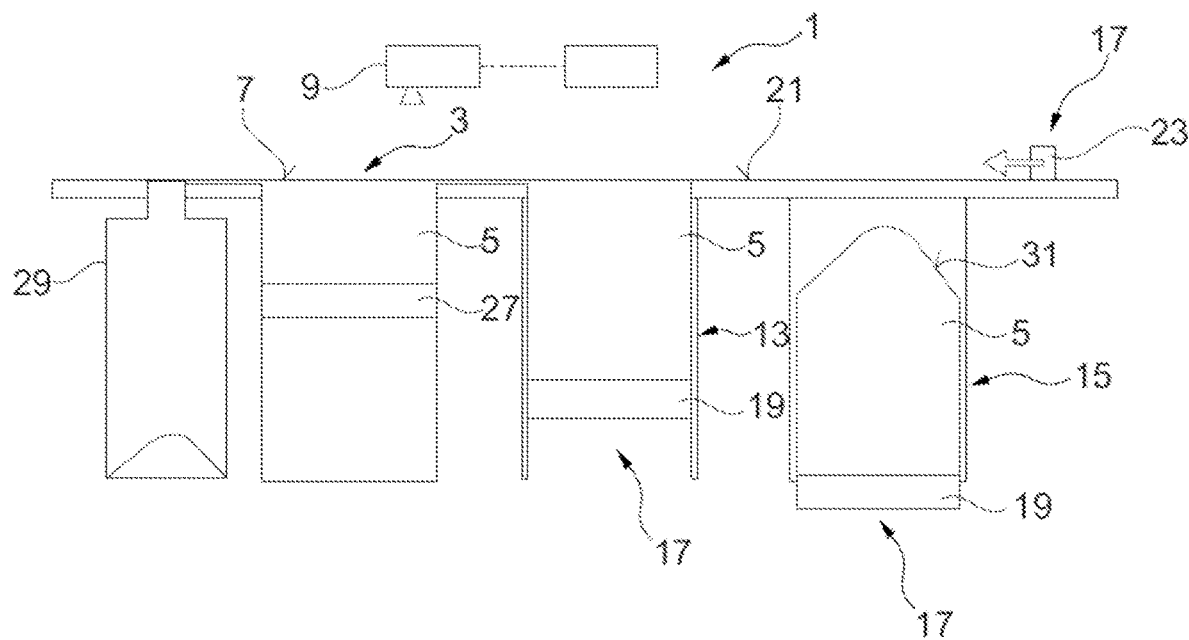

FIG. 1a shows a plan view of an exemplary embodiment of a powder bed-based manufacturing device 1, and FIG. 1b shows a side view of the manufacturing device 1. The manufacturing device 1 is configured for the additive, in particular generative, manufacturing of a component from a powder material 5. It comprises a construction location 3, which is configured to construct a component layer-by-layer on the construction location 3 from the powder material 5 present in the form of a powder bed, a working powder layer 7 being producible in particular on the construction location 3. The manufacturing device 1 also comprises an optical recording device 9, preferably a camera, which is configured to take optical recordings of the construction location 3, and in particular of the working powder layer 7. The manufacturing device 1 furthermore comprises a control device 11, which is actively connected to the optical recording device 9 or integrated into the optical recording device 9, and is configured to locally evaluate at least one optical recording, taken by the optical recording device 9, of the working powder layer 7 and to examine the working powder layer 7 for local coating defects with the aid of the local evaluation of the optical recording. Local coating errors in or on the working powder layer 7 may thus be identified rapidly, preferably automatically and reliably.

The manufacturing device 1 comprises at least one feed container, here a first feed container 13 and a second feed container 15, powder material 5 being deliverable from at least one of the feed containers 13, 15 onto the construction location 3 by means of a delivery mechanism 17. The delivery mechanism 17 respectively comprises a height-displaceable lifting piston 19 in the feed containers 13, 15, with the aid of which the powder material 5 in the respective feed container 13, 15 can be delivered upward to the level of a working stage 21 of the manufacturing device 1. The delivery mechanism 17 furthermore comprises a powder slider 23, with which the powder material 5 can be delivered on the working stage 21 from at least one of the feed containers 13, 15 to the construction location 3, in particular onto a construction platform 25. The powder material 5 is applied layer-by-layer in the form of the working powder layer 7 on the construction location 3 and is locally solidified by an energy source, in particular a radiation source, resulting in a component being constructed layer-by-layer. In order to make this possible, a working piston 27 at the construction location 3 is lowered stepwise, in particular plane-by-plane, so that a new working powder layer 7 can be applied on the construction location 3 following solidification of powder material 5 within a working powder layer 7 after lowering of the working piston 27 by the distance of one construction plane.

An overflow container 29, into which excess powder material 5 can be delivered by the delivery mechanism 17, in particular the powder slider 23, is also represented.

Coating errors of the working powder layer 7 may occur during the production of a component, in particular because of volume shrinkage in a previously fused working powder layer 7, by edges of fused powder material protruding upward into the plane of the working powder layer 7 to be newly formed, by smoke particles, or by metal splashes. Coating errors may, however, also initially happen during first application of the working powder layer 7 at the start of the manufacturing of a component, in particular because of an unsuitable geometrical distribution of the powder material 5 in the feed containers 13, 15.

FIG. 1*b* schematically shows that the first feed container 13 is in this case being used for the additive manufacturing of a component. The second feed container 15, on the other hand, is not being used. The latter is instead freshly filled with a new powder material 5. A top layer 31 of the powder material 5 in this case has a topography differing from a planar topography, in particular the topography of a loose material cone. If transport of powder material 5 from the second feed container 15 to the construction location 3 is then started, the working powder layer 7 is initially created only incompletely, or incomplete coating of the construction location 3 with powder material 5 takes place, because of the conical topography of the top layer 31. The latter must therefore be made to approximate a predetermined setpoint topography, in particular a planar topography—as is represented here for the first feed container 13—prior to the start of the manufacturing of a component, before a component can be constructed without defects.

With the manufacturing device 1 and the method proposed here, it is possible both to deduce a topography of the top layer 31 with the aid of coating errors established in the working powder layer 7, and to examine the working powder layer 7 for coating errors during ongoing operation of the manufacturing device 1 for the layered construction of a component.

A local coating error, for which the working powder layer 7 is examined, is in this case preferably selected from a group consisting of a deficiently coated region, an uncoated region, an irregularly coated region, and a torn edge.

The optical recording is preferably made by the optical recording device 9 with a resolution which is selected, in relation to an average powder particle size of the powder material 5, in such a way that brightness variations in individual pixels of the optical recording due to a locally different arrangement of the powder particles can be established.

In the scope of the method that may be carried out with the manufacturing device 1, at least one optical recording of the working powder layer 7 on the construction location 3 is taken, this at least one optical recording being locally evaluated, the working powder layer 7 being examined for local coating errors with the aid of the evaluation of the optical recording.

Preferably, at least one first optical recording of a first working powder layer 7 is compared with a second optical recording of a preceding second working powder layer 7—from a preceding construction step, the first working powder layer 7 being examined for local coating errors with the aid of the comparison of the first optical recording with the second optical recording.

Preferably, a coating error is in this case locally detected where a difference between the first optical recording and the second optical recording is less than a predetermined limit difference or does not exist.

Preferably, the first optical recording is correlated—in particular locally—with the second optical recording, a correlation image being produced, the correlation image being examined for local coating errors.

Figure 2:
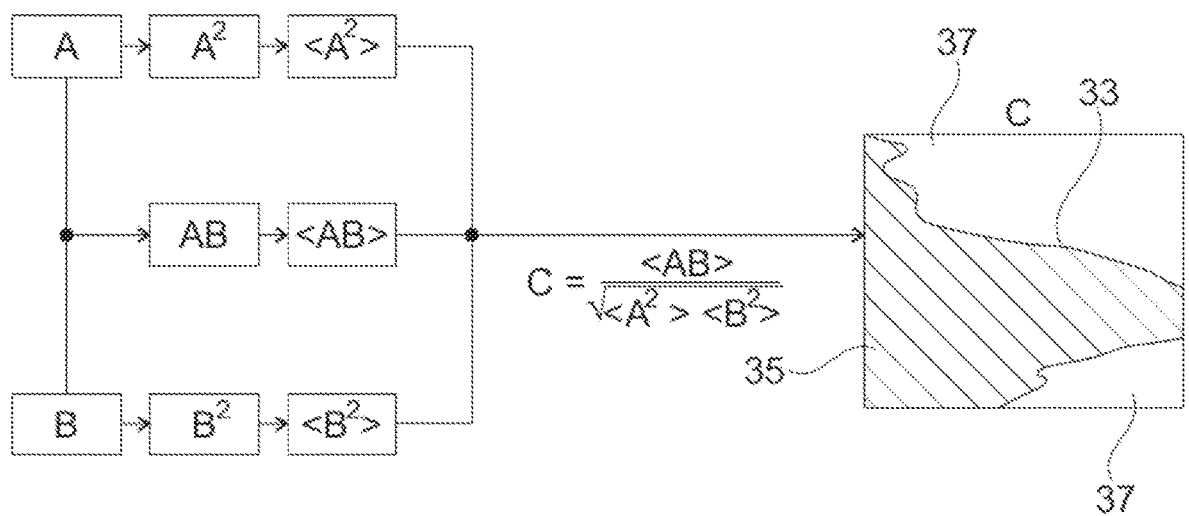
FIG. 2 shows a schematic representation of an embodiment of a method for operating the manufacturing device according to FIG. 1.

FIG. 2 shows a schematic representation of one embodiment of the method. In this embodiment, a first optical recording A of a first working powder layer 7 is correlated with a second optical recording B of a second, preferably directly preceding, working powder layer 7 by the first optical recording A and the second optical recording B being multiplied with one another pixel-by-pixel, a multiplication image AB being obtained. The first optical recording A is squared pixel-by-pixel, from which a first exponential image $A^2$ is obtained. The second optical recording B is likewise squared pixel-by-pixel, from which a second exponential image $B^2$ is obtained. The multiplication image AB, the first exponential image $A^2$ and the second exponential image $B^2$ are locally averaged, from which first a first averaged exponential image $<A^2>$, secondly a second averaged exponential image $<B^2>$ and thirdly an averaged multiplication image $<AB>$ are obtained.

A correlation image C is then obtained by dividing the averaged multiplication image $<AB>$ by the square root of the product of the first averaged exponential image $<A^2>$ with the second averaged exponential image $<B^2>$, in particular according to Equation (1).

Regions of the new working powder layer 7 that have been newly coated without errors have lower correlation values in the correlation image C than deficiently coated or uncoated regions, which have higher correlation values, in particular close to 1. In the example of the correlation image C as represented here, a torn edge 33, which separates a defect-free newly coated region 35 from uncoated regions 37, may be seen clearly.

If coating errors are detected, in the scope of the method measures are preferably taken to compensate for the coating errors or eliminate the causes of the coating errors. In particular, measures may be instigated to make the topography of the top layer 31 approximate the predetermined setpoint topography, in particular by suitable actuation of the delivery mechanism 17. During the manufacturing of a component, measures may also be taken to eliminate coating errors in the working powder layer 7 during ongoing operation, for example by recoating or new coating.

While subject matter of the present disclosure has been illustrated and described in detail in the drawings and foregoing description, such illustration and description are to be considered illustrative or exemplary and not restrictive. It will be understood that changes and modifications may be made by those of ordinary skill within the scope of the following claims. In particular, the invention defined by the following claims may cover further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a powder bed-based manufacturing device for additive manufacturing of a component from a powder material, the method comprising:
    taking, using an optical recording device, a first optical recording of a first working powder layer of the powder material on a construction location of the manufacturing device;
    taking, using the optical recording device, a second optical recording of a second working powder layer preceding the first working powder layer;
    correlating, using a control device, the first optical recording and the second optical recording to obtain a correlation image, wherein correlating the first optical recording and the second optical recording comprises multiplication of the first optical recording and the second optical recording pixel by pixel, and wherein each pixel of the correlation image comprising a respective correlation value;
    detecting, using the control device, local coating errors in the first working powder layer based on the correlation value of each pixel of the correlation image; and
    upon detection of at least one local coating error in the first working powder layer, actuating a powder delivery mechanism of the manufacturing device to compensate for the at least one local coating error or eliminate the at least one local coating error.

2. The method as claimed in claim 1, wherein the at least one local coating error is selected from a group consisting of a deficiently coated region, an uncoated region, an irregularly coated region, and a torn edge.

3. The method as claimed in claim 1, wherein the first optical recording and the second optical recording are made with a resolution which is selected, in relation to an average powder particle size of the powder material, in such a way that brightness variations in individual pixels of the first optical recording and the second optical recording due to a locally different arrangement of powder particles of the powder material is capable of being established.

4. The method as claimed in claim 1, further comprising deducing a topography of a top layer of the powder material in a feed container based on the at least one local coating error.

5. The method as claimed in claim 1, wherein the detection of the at least one local coating error in the first working powder layer is performed during ongoing operation of the manufacturing device for the layered construction of the component.

6. The method as claimed in claim 1, wherein the at least one local coating error is detected where a difference between the first optical recording and the second optical recording is less than a predetermined limit difference.

7. The method as claimed in claim 1, wherein correlating the first optical recording and the second optical recording comprises:
    obtaining a multiplication image by the multiplication of the first optical recording and the second optical recording pixel-by-pixel;
    obtaining a first exponential image by squaring the first optical recording pixel-by-pixel;
    obtaining a second exponential image by squaring the second optical recording pixel-by-pixel; and
    locally averaging the multiplication image, the first exponential image and the second exponential image to obtain an averaged multiplication image, an averaged first exponential image and an averaged second exponential image, respectively;
    wherein the correlation image is obtained by dividing the averaged multiplication image by a square root of a product of the averaged first exponential image with the averaged second exponential image.

8. A manufacturing device for the additive manufacturing of a component from a powder material, the manufacturing device comprising:
    a construction location configured for the additive construction of a component from the powder material on the construction location;
    an optical recording device configured to take a first optical recording of a first working powder layer of the powder material on the construction location, and a second optical recording of a second working powder layer preceding the first working powder layer; and
    a control device configured to:
        correlate the first optical recording and the second optical recording to obtain a correlation image, wherein correlating the first optical recording and the second optical recording comprises multiplication of the first optical recording and the second optical recording pixel by pixel, and wherein each pixel of the correlation image comprises a respective correlation value;
        detect local coating errors in the first working powder layer based on the correlation value of each pixel of the correlation image; and
        upon detection of at least one local coating error in the first working powder layer, actuating a powder delivery mechanism of the manufacturing device to compensate for the at least one local coating error or eliminate the at least one local coating error.

* * * * *